United States Patent

[11] 3,612,907

[72] Inventor Theodore Gustav Braunholtz
1304 Marinette Road, Pacific, Palisades, Calif. 90272

[21] Appl. No. 835,046
[22] Filed June 20, 1969
[45] Patented Oct. 12, 1971

[54] SELF-CHECKING FLIP-FLOP
8 Claims, 1 Drawing Fig.

[52] U.S. Cl. .......................................................... 307/272,
307/232, 307/269, 307/291, 328/206, 340/146.1
[51] Int. Cl. .......................................................... H03k 5/20,
G06f 11/00, G08b 29/00
[50] Field of Search .............................................. 307/291,
232, 272, 269; 328/201, 206, 182; 340/146.1

[56] References Cited
UNITED STATES PATENTS

| | | | |
|---|---|---|---|
| 3,116,477 | 12/1963 | Bradbury ...................... | 307/291 X |
| 3,305,830 | 2/1967 | Constantine, Jr. ............ | 307/291 X |

*Primary Examiner*—Donald D. Forrer
*Assistant Examiner*—John Zazworsky
*Attorney*—Smyth, Roston & Pavitt

ABSTRACT: A supervisory circuit is disclosed for use in conjunction with a clocked flip-flop to determine whether inputs thereof change during the period required for settling of signals for proper response of the flip-flop.

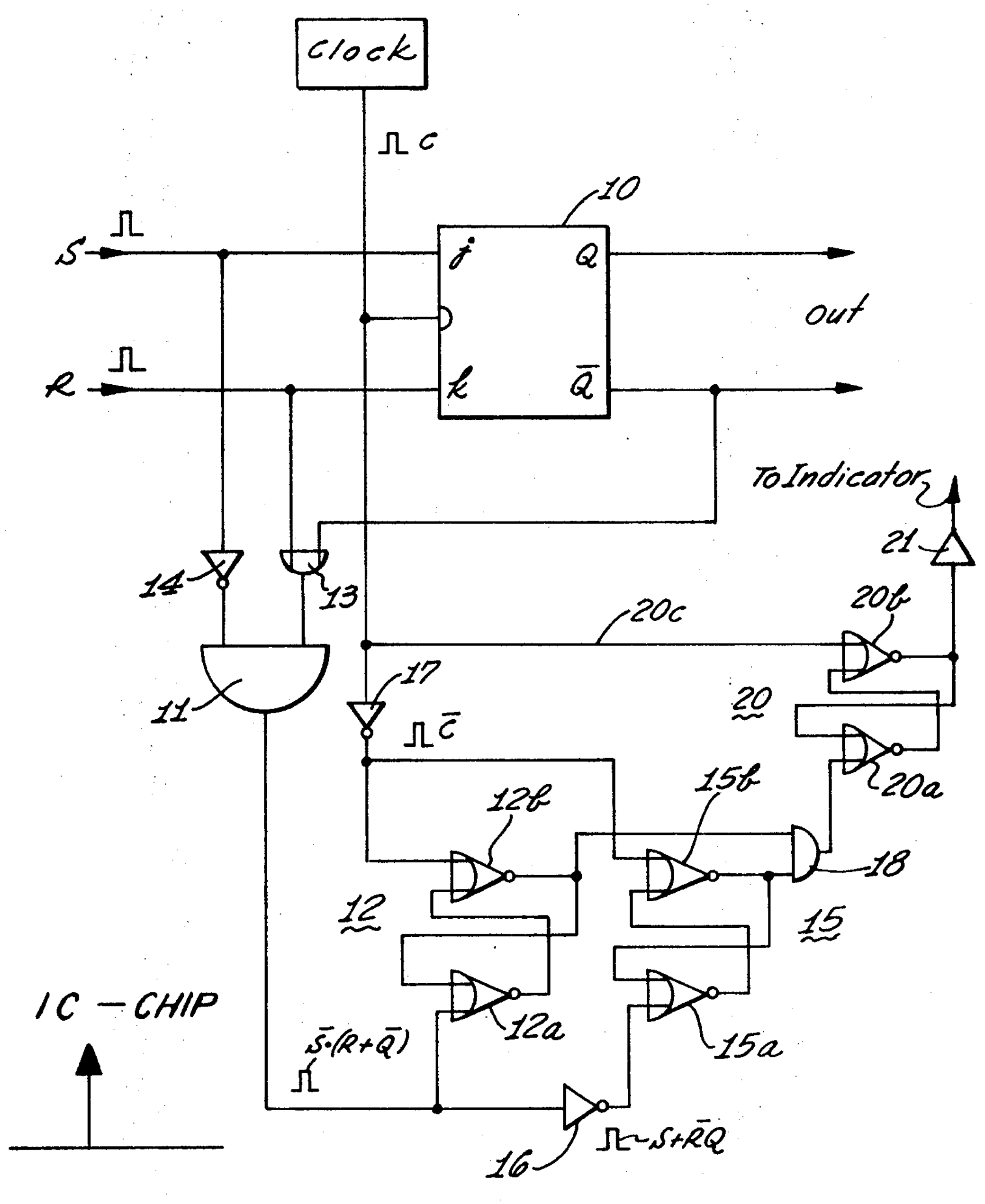
INVENTOR:
Theodore G. Braunholtz
By Smyth, Roston & Pavitt
ATTORNEYS

SELF-CHECKING FLIP-FLOP

The present invention relates to electronic switching circuits such as flip-flops in general, and more particularly the invention relates to supplementary circuitry for improving the cooperative participation of a flip-flop in the operation of electronic systems having large numbers of flip-flops.

In modern high-speed digital data processing systems signal travel time has become a factor to be considered to a greater degree. In such a system there are numerous flip-flops and it may be presumed for convenience that they operate in synchronism with a common clock. If a flip-flop within the system changes state, for example, on the falling edge of the clock, the new state may not necessarily be available everywhere within the system as an input. The circuit may require, for example, that the new state of the flip-flop be considered at the next clock as an input for another flip-flop. However, that other flip-flop may have a remote location so that signal travelling time cannot be neglected. Moreover, inputs have to be assembled sufficiently ahead of the effective trigger to allow for settling of signal levels in the several components.

Most flip-flops require completion of input signal assembly prior to the leading edge of a clock signal in order to trigger on falling clock, but newer flip-flops permit input assembly to take place during a clock pulse prior to a minimum period preceding the falling edge thereof. Of course, for high clock rates that minimum period may amount to a considerable portion of the total clock pulse duration.

There is, therefore, a need to obtain an indication if the operation of a flip-flop becomes marginal as far as its input signal assembly is concerned or is even impaired for reasons of a delay in the input signals assembly so that they change immediately prior to the operative trigger edge of the clock pulse. It is, therefore, an object to provide supplementing or supervisory circuitry for individual flip-flops which monitors the due arrival of inputs, sufficiently ahead of the "cutoff" point when delayed arrivals may lead to errors in the operation.

Control flip-flops operating as switches, state indicator or the like, usually operate on a highly individual basis and are usually contained in a single integrated circuit chip. Therefore, additional circuitry can readily be included in that chip with little extra expenditure. This additional circuitry has as its task the detection of changes in the inputs during periods when such changes may or, in fact, do impair proper response of the flip-flop. Multiple flip-flops on a single chip often cooperate essentially with each other and in response to common inputs; they may need such supervisory circuitry only collectively. For example, a shift register needs only such supervisory circuitry with regard to input signals received by the input stage. The timing operation as between the other stages is fixed and, of course, there is no problem as to delay of signals traveling from one flip-flop to the next one on the same integrated circuit chip.

In accordance with the invention it is suggested to provide a pair of latches (simple, unclocked, set-reset-type flip-flops); a first latch of the pair is connected to respond to a first plurality of combinations of inputs while the second latch of the pair responds to a second plurality of combinations of inputs, such that both latches will respond if an untimely change in the combination of inputs will affect the state of flip-flop. In the preferred embodiment one or the other of the latches will set during, or at the end of, the period of normal and proper input signal assembly. The control circuit for the latches is such that the input signals may change during that period and only one latch will be set at the end of the period of normal input signal assembly. Subsequently thereto, i.e., from the end of the period of normal assembly up to the time of the trigger edge for the flip-flop, the inputs should not change, either because flip-flop operation may become marginal or an error could positively result from such a change. This period will, in the following, be called the critical period. If there is a significant change of inputs during that critical period, the other latch sets likewise, and the concurrence of set states of the two latches is indicated.

A significant change in inputs is distinguished from an insignificant change as follows. Assuming the flip-flop is in the set state, then the appearance of a set input signal during the critical period, or the disappearance of a previous timely set input signal is of no significance at all. However, the appearance of a reset signal in the critical period or the disappearance of a reset signal which was true in the normal input assembly period, is a significant change to be indicated.

In order to distinguish a significant change from an insignificant one, the latches are controlled by inputs for the flip-flop, as well as by signals representing the current state of the flip-flop. It should be mentioned, however, that the supervisory circuit could be designed such that any change in inputs, significant or not, during the critical period, is indicated, in which case the current state of the flip-flop could be disregarded for latch control.

As flip-flops normally change state on falling clock, the preceding clock pulse period will be regarded as the critical period and the clock pulse pause prior thereto is the period of normal input signal assembly. One of the latches will always be set on rising clock, the other one may set during the clock pulse period if there is a significant change. The latches are reset on about falling clock or slightly thereafter. Concurrent set states, if occurring, are set into an output latch which thus provides the desired indication. The set state of the output latch can be used in any suitable manner for testing or indicating purposes, error signaling, or the like.

The two input latches are controlled, for example, as follows: In general, the input circuit for one of the two input latches is constructed such that, for example, the latch will set on rising clock if the flip-flop is in the set state, in the absence of an input or inputs tending to reset the flip-flop. Alternatively, the latch will set if the combination of inputs proper is such that the flip-flop will set on the next falling clock. The other latch is controlled analogously substituting "reset" for "set." It follows then that always one of the two latches sets on rising clock in dependence upon the state in which the flip-flop is expected to be after the soon following falling clock; this may be the state in which the flip-flop already is or a new state. The other latch sets during positive clock if inputs change during that flop period so that the state of a flip-flop is or may be different from the state as was determined at the time of rising clock.

The two latches are not necessarily controlled in input signal symmetry. S and R may respectively denote set and reset input signals for the flip-flop having set and reset states Q and $\bar{Q}$, respectively. Assuming the flip-flop to be supervised is of the set-override-reset type, one latch will set on $S+\bar{R}Q$, the other one on $\bar{S}(R+\bar{Q})$. If the flip-flop is of the *j-k* type, one latch will set on $\bar{Q}S+Q\bar{R}$, the other latch will set on $QR+\bar{Q}\bar{S}$.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which there is shown a block diagram for the preferred embodiment of the present invention.

Proceeding now to the detailed description of the drawing, there is illustrated a clocked flip-flop 10. It is presumed, that the flip-flop is operated by a clock, alternating between true, e.g. positive, clock pulse states C and false clock pulse states $\bar{C}$. For reasons of describing the preferred embodiment of the present invention it is presumed that the flip-flop is of the set-override-reset type, such as is traded, for example, under the designation SDS 307 or SDS 311. Also, this type of flip-flop is described in U.S. Pat. application Ser. No. 460,408, filed June 1, 1965, of common assignee. As far as the present invention is concerned, it is merely necessary to state that this type of flip-flop is of the master-slave type in which the master portion accepts input signals applied during positive clock pulse period up to the beginning of a tolerance period ahead of the falling clock. As the clock falls, the master portion triggers the slave portion. As stated, the master portion, in particular of such flip-flop, is constructed to be of the set-override-reset type, i.e., if set and reset input signals are applied concurrently, the set inputs prevails. The input circuit for such a flip-flop can be adapted by means of a few additional gates to operate as a conventional *j-k* flip-flop which, as is known, resolves the conflict arising from concurrent set and reset inputs just by changing state.

Even though the inputs are gated into the master portion of such a flip-flop during the positive clock and can change prior to the tolerance period alluded to above, performance safety may become marginal if it is relied upon that input signals may, in fact, arrive so late. The flip-flop supplementing and supervising circuit provides indications whether or not there is a change in the input signals during the positive clock for permitting evaluation of how marginal the operation of the system actually is.

The flip-flop 10 could be of any kind, including conventional flip-flop designs requiring completion of the input signal assembly prior to the positive clock. In this case, the circuit to be described next serves as an error indicator as any change in the inputs during positive clock establishes error, indeed!

A first AND-gate 11 has one input coupled to the output of an inverter 14 which receives the set or J input S for flip-flop 10, i.e., one input for gate 11 is the signal $\bar{S}$. A second input of gate 11 receives the reset of K input R for flip-flop 10 via an OR-gate 13, having as second input the reset output signal side $\bar{Q}$ of flip-flop 10. Thus, gate 11 turns true under the condition: $\bar{S}(R+\bar{Q})$.

The output signal of gate 11 is applied to a first latch 12 comprised of two cross-coupled NOR-gates 12*a* and 12*b*, whereby in particular the output of gate 11 is applied to the NOR-gate 12*a*. The other input of latch 12 is the inverted clock pulse, or $\bar{C}$, derived from the clock line through an inverter 17 and fed to NOR-gate 12*b*. Latch 12 is regarded as being in the set state, when the output of NOR-gate 12*b* is true. The latch if set will reset on leading-edge of the negative or inverted clock, i.e., upon $C\rightarrow\bar{C}$. Latch 12 can set on $\bar{C}\rightarrow C$ (rising clock) when the output of gate 11 is true at that time, or at any time gate 11 turns true during C=1 (clock positive or true).

A second similar latch 15 is provided, having cross-coupled NOR-gates 15*a* and 15*b*. NOR-gate 15*a* receives the inverted output of gate 11 as provided by an inverter 16. Latch 15 is thus set in response to the signal $\overline{\bar{S}(R+\bar{Q})}=S+\bar{R}Q$. Latch 15 will set on $\bar{C}\rightarrow C$ (rising clock) when the output of gate 11 is false at that time, or turns false subsequently while C=1. The latch 15 is likewise reset on falling clock, i.e., at the beginning of a negative clock pulse period.

In summary then, the latches respond as follows, latch 12 sets during appropriate times if S=0 and R=1 or when S=0 and the flip-flop 10 is already in the set state, regardless of the signal R. This reflects the set-override-reset feature of the flip-flop to be supervised. Latch 15 will set if S=1 regardless of the input R and regardless of the state of flip-flop. For S=0 latch 15 sets if the flip-flop is in the reset state and R–0. Both latches reset on falling clock ($C\rightarrow\bar{C}$).

It should be noticed that always one of the two latches 12 or 15 will set on $\bar{C}\rightarrow C$ (rising clock), even if there is no change in the inputs R and S, as the state of the flip-flop 10 itself causes one or the other of the two latches 12 or 15 to set. The absence of any input is regarded as one combination of inputs to be monitored as the absence of input means that after the next falling clock the flip-flop will be in the same state as it was before. It is repeated that the latches indicate the state in which the flip-flop is expected to be at the next falling clock and the input control for the latches, reflects this condition.

If there is a significant change in the input signals during subsequent positive clock, which bears on the ensuing state of flip-flop 10, as compared with the combination of inputs on $\bar{C}\rightarrow C$ (rising clock) the respective other latch will be set. During the negative clock ($\bar{C}$=1), both latches 12 and 15 are reset, i.e., the outputs of gates 12*b* and 15*b* are both false, and the outputs of NOR-gates 12*a* and 15*a* are both true latching the latches to the reset state. The outputs of gate 11 and of inverter 16 do not affect the latches at that time.

It may now be assumed, for example, that during the negative clock, $\bar{C}$=1, gate 11 turned true and remains true on rising clock, $\bar{C}\rightarrow C$. Therefore, latch 12 is set on rising clock while latch 15 stays reset as inverter 16 provides a false pulse output at that time. During the now following positive clock period, C=1, NOR-gate 15*a* of the latch 15, receiving the output of inverter 16 has its latching input false, and thus the NOR-gate 15*a* provides a true output commensurate with the reset state of latch 15. This, however, prepares the latch for immediately setting if during positive clock period the output of inverter 16 turns true, latch 15 will then set immediately. Latch 12 is not affected by the concurrent change of the output of gate 11 to the false state because the output of gate 11 was latched into the latch 12 at rising clock. Hence, both latches will be in the set state at the end of the positive clock pulse period.

The two latches operate, in effect, as closed gates for any (complementary) change in the outputs of gate 11 and inverter 16 during negative clock pulse periods. However, as the clock rises ($\bar{C}\rightarrow C$) one or the other of the latches will set. Thereafter the latch which did not set is an open gate and sets likewise if there is a change in the outputs of gates 11. Hence, the period C=1 marks the critical period of supervision.

It will now be described that the circuit does, in fact, control both latches to set when a significant change in inputs occurs during the critical period preceding the falling clock, when the clock is true. For example, flip-flop 10 may be assumed to be initially in set state ($\bar{Q}$=0). If S=1 during $\bar{C}$=1 latch 15 sets on $\bar{C}\rightarrow C$ (rising clock). If S→0 during C=1 nothing happens as the disappearance of the set signal has no significance because the flip-flop is already set. If, however, not only S→10 but also $\bar{R}$→1 latch 12 sets also as that was a significant change.

If the flip-flop 10 is initially in the reset state, and S=1 on $\bar{C}\rightarrow C$ latch 15 sets. If S turns falls during $\bar{C}$=1 latch 12 sets also and again both latches will be in the set state toward the end of the positive clock.

If flip-flop 10 is initially in the reset state, an initial combination of inputs R=1, S=0 does not change state of the flip-flop, latch 12 sets if now S→1 latch 15 sets likewise as the new combination S=R=1 constitutes a significant change.

If the flip-flop 10 is originally in any state, and S=R=1 during the negative clock ($\bar{C}$=1), latch 15 sets. If R→0 during positive clock nothing happens as the flip-flop is presumed to be of a set-override-reset type and presence or absence of the reset signal is of no significance in the presence of the set signal S. Thus, a change in the reset signal R during the positive clock is not a significant change and is not used to set latch 12 when the signal S persists.

If R=1 during $\bar{C}$=1 but S=0, latch 12 sets regardless of the state of flip-flop 10. If R turns false during the positive clock, latch 15 sets also but only if flip-flop 10 was in the set state. If again R=1, S=0 on $\bar{C}\rightarrow C$ (rising clock) latch 12 sets regardless of the state of the flip-flop. If S→1 during positive clock latch 15 sets likewise as the change in inputs is significant because of the set-override-reset feature of flip-flop 10.

It follows then that for all significant changes in the input combination during positive clock both latches 12 and 15 will be in the set state on falling clock.

An AND-gate 18 determines whether or not the two latches 12 and 15 are both in the set state as an indication that there was significant change in inputs during the positive clock pulse period. A response by gate 18 to concurring set states of latches 12 and 15 sets an indicator latch 20 on falling clock. Latch 20 resets with the leading edge of the next positive clock. Latch 20 has cross-coupled NOR-gates 20*a* and 20*b*.

It should be noted that latch 20 latches in response to concurrent set states for latches 12 and 15 on the same clock edge, $C\rightarrow\bar{C}$ (falling clock) used to reset latches 12 and 15. Thus, the falling clock must be effective in gate 20*b* via line 20*c* and for latching the input of gate 20*a* prior to the resetting of latches 12 and 15 by the same falling clock edge, causing gate 18 to turn false. This can be accomplished, for example, by introducing a slight delay in the output of inverter 17 forming the pulse $\bar{C}$ as a separate signal.

Latch 20 provides a true signal via an output amplifier 21 whenever there is a change in inputs during a positive clock. This indicator signal can be used in any desired manner such as driving an indicator lamp, shifting operation to a redundancy circuit or initiating an error routine, or such a signal is used for occasional tests only. All of the elements described are preferably on the same integrated circuit chip.

The circuit as described monitors occurrence of significant changes in the inputs as defined. In deviation from the circuit 10 described, one could control latches 12 and 15 directly in response to signals R and S respectively; in this case any change in applied input signals (excluding R=S=0) results in concurrent set states of the latches.

The invention is not limited to the embodiments described above but all changes, and modifications thereof not constituting departures from the spirit and scope of the invention are intended to be included.

I claim:

1. In a flip-flop circuit which includes a bistable device connected to be responsive to set input, reset input and clock input signals for changing state in dependence upon set and/or reset signals at the time of a falling clock, the combination comprising:

first and second latching circuits each having set and reset states and being connected to be placed in the set state, individually and respectively in response to different combinations of the set and reset input signals as applied to the bistable device, and further connected to be placed in the reset state on the falling clock in synchronism therewith; and means connected to the first and second latching circuits to provide an indication of concurrence of the set state of the first and second latching circuits.

2. In a flip-flop circuit as set forth in claim 1, including first means connected to the first latching circuit for providing thereto a first signal when the bistable device is expected to be in the set state after the next falling clock;

second means connected to the second latching circuit providing thereto a second signal when the bistable device is expected to be in the reset state after the next falling clock, and means operating the first and second latching circuits to latch in response to the first and second signals respectively if produced between rising and falling clock.

3. In a flip-flop circuit which includes a bistable device responsive to set and reset inputs and operating in response to trigger signals, the combination comprising:

first means connected to assume a first particular state in response to inputs applied to the flip-flop circuit and to the bistable device therein, at a particular instant prior to a trigger signal, the inputs determining the state of the bistable device after this trigger signal;

second means included in the first means and connected to cause the first means to assume a second particular state if the inputs change subsequent to the particular instant prior to the trigger signal; and means connected to provide an indication of the presence or absence of the second particular state.

4. In a flip-flop circuit as set forth in claim 3 and receiving alternating true and false clock pulses, the bistable device being triggered when the clock pulse turns from true to false, the first means assuming a state when the clock pulse turns from false to true, the second means causing the first means to assume the second state when the inputs change during a true clock pulse.

5. In a flip-flop circuit as set forth in claim 3, the first means comprising a pair of latches, only one of them being set in response to a signal preceding each trigger signal, the second state being the concurrent set state of both latches, the flip-flop circuit including a third latch connected to be set upon concurrence of the set state of both latches of the pair.

6. In a flip-flop circuit as set forth in claim 3, including means to receive alternating true and false clock pulses, the bistable device being triggered when the clock turns from true to false, the first means including a pair of latches connected to receive the clock, one or the other of the pair being set as the first state of the first means upon change of the clock from false to true when the bistable device is respectively expected to be in the set or reset state at the next clock change from true to false by operation of the inputs at the time the clock changes from false to true, the second means causing both latches to set as the second state of the first means when there is a change in inputs during the true clock tending to deviate the state of the bistable device from the expected one.

7. In a flip-flop circuit as set forth in claim 3, the flip-flop, the first, second and last means being on an integrated circuit chip.

8. In a flip-flop circuit which includes a bistable device responsive to set, reset and clock signals for changing state in dependence upon set and/or reset signals at the time of a falling clock, the combination comprising:

first and second latching circuits;

first means connected to provide a first control signal representing the establishing or maintaining of the set state in the bistable device on falling clock;

second means connected to provide a second control signal representing the establishing or maintaining of the reset state in the bistable device on falling clock;

means for connecting the first means to set the first latching circuit in response to the first control signal when present during a particular period preceding each falling clock;

means for connecting the second means to set the second latching circuit in response to the second control signal when present during the particular period preceding each falling clock; and means connected to be responsive to concurrent set states of the latching circuits at each falling clock.